Aug. 4, 1931.  J. W. WHITE  1,816,943

WHEEL

Filed Aug. 7, 1925

Inventor
JOHN W. WHITE

By Clarence F. Walker.
His Attorney

Patented Aug. 4, 1931

1,816,943

UNITED STATES PATENT OFFICE

JOHN WILLIAM WHITE, OF BUFFALO, NEW YORK, ASSIGNOR TO KELSEY-HAYES WHEEL CORPORATION, OF DETROIT, MICHIGAN, A CORPORATION OF NEW YORK

WHEEL

Application filed August 7, 1925. Serial No. 48,794.

This invention relates to an improvement in wheels, more particulary in wheels of the steel spoked type in which a demountable rim is mounted upon the ends of the spokes and to the manner of securing the rim in that position.

The primary object of this invention is to provide in a spoked wheel means for rigidly securing a demountable rim on the ends of the spokes, all of said means acting to position the rim laterally, and certain of said means acting also to prevent any peripheral movement of the rim relative to the spokes.

Other objects of this invention will appear from a consideration of the following specification, taken in connection with the drawings which form a part thereof, and in which Fig. 1 is a side elevation of a wheel embodying this invention;

Figures 2, 3:
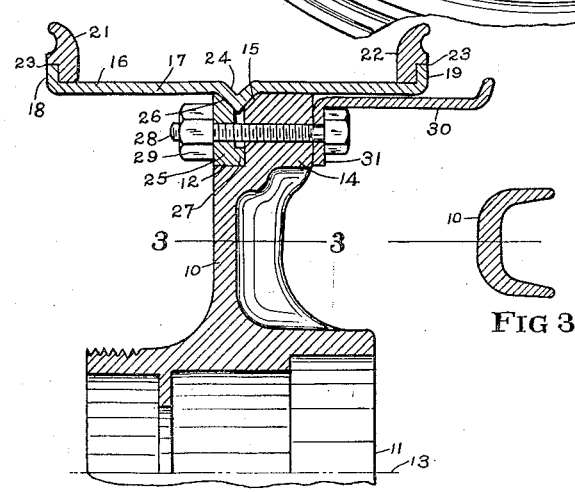
Fig. 2 is a sectional view taken along the line 2—2 of Figure 1.
Fig. 3 is a sectional view taken along the line 3—3 of Figure 2.

Referring to the drawings, the reference numeral 10 is employed to designate the wheel spokes which are, as here shown, cast integral with the hub 11. The spokes are curved in cross section, as shown in Figure 3, and each spoke is provided with a seat 12, the base of which is a portion of the periphery of a cylinder having its center at the center line 13 of the wheel. The ends of the spokes 10 are enlarged to provide blocks 14 behind the seats 12. The particular form of the block 14 is not essential except that it must be provided with an inclined face 15 at the front outer corner, for reasons which will be described later.

Figure 1:
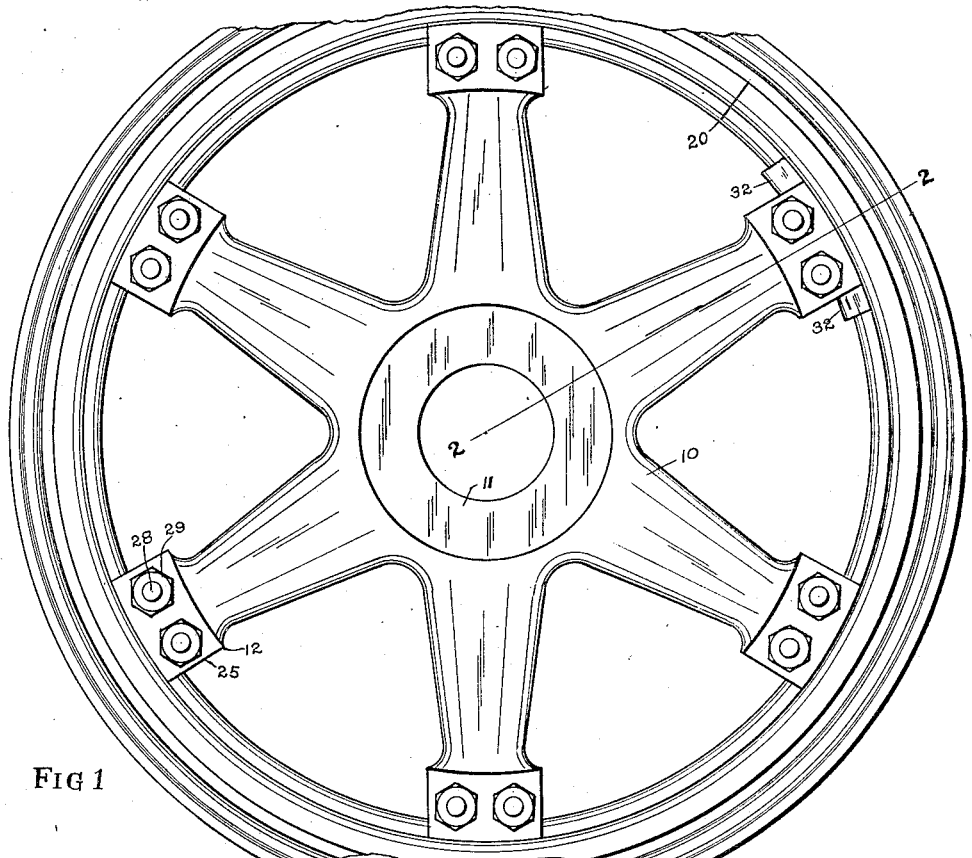

Demountably carried by the spokes 10 is a rim 16, which preferably comprises a base 17 having annular flanges 18 and 19 and transsplit as at 20 in Figure 1. Mounted upon the base 17 are rim rings 21, 22. Each of these rings is continuous and is cut away at 23 to form a seat which rests upon the ends of the flanges 18 and 19, as shown in Figure 2. Since the base 17 is split at 20, it can of course be contracted when desired to release the rings 21, 22, and permit the removal of the tire, not shown. When the base is expanded into the position shown in the drawings, it is obvious that the rings 21, 22 will prevent any further expansion of the base, and thus provide a solid seat for the tire.

The rim base 17 is provided at its center with an annular V-shaped bead or depression 24, which when the rim is mounted on the spokes rests against the corner 15 of the block 14 provided on each spoke 10. The rim is thus in its proper position and is prevented from being forced inwardly beyond the center line of the wheel. The rim is held in this position by means of a plurality of lugs 25, one being provided for each spoke. Each lug 25 rests upon the seat 12 and is provided with an inclined face 26, which is clamped against the outer face of the bead 24. A flange 27 at the base of each lug rests against the outer face of the block 14, and thus positions the face 26 with reference to the rim. Each lug 25 is held in this position by means of bolts 28 and nuts 29. The bolt 28 passes through the block 14 and the nut 29 tightened onto the bolt bears against the outer face of the lug 25. As shown in the drawings, two such bolt and nut assemblies are provided for each lug, but obviously the number could be changed if desired.

Mounted upon the spokes 10 is a brake drum 30, which is preferably provided with a flange 31 which rests against the inner face of the blocks 14 and is clamped in that position by means of the bolts 28. The bolts 28 may be threaded through the blocks 14, so that removal of the nuts 29 to release the lugs 25 will not disturb the brake drum mounting.

In order to provide driving connection between the spokes and the rim any suitable means may be employed, such as for example the use of blocks 32 secured to the rim base 17 and spaced apart such a distance that one of the lugs 25 will enter between the blocks 32 and thus prevent any peripheral movement of the rim relative to the wheel.

Figure 4:
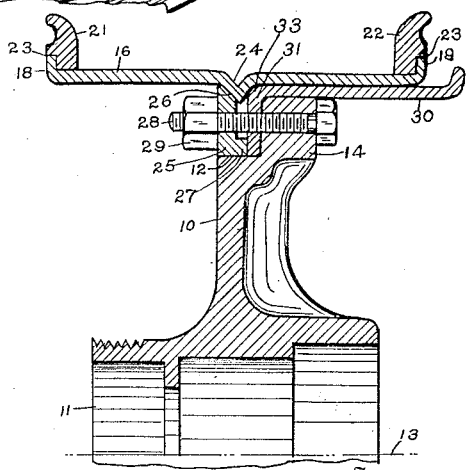
Fig. 4 is a view similar to Figure 2, showing another embodiment of this invention.

Figure 4 shows an embodiment of this invention in which the brake drum is secured to the outer face of the block 14 and acts to support the rear face of the bead 24. In this construction the seat 12 is deepened to receive the flange 31 of the brake drum 30, and the inner face of the bead 24 rests against the inclined face of the corner 33 of the drum.

While two embodiments of this invention have been shown and described, applicant is not limited thereto, since it is obvious that other embodiments can be made without departing from the spirit and scope of this invention as set forth in the following claims.

Having thus set forth my invention what I claim as new and for which I desire protection by Letters Patent is:

1. In a steel spoke wheel having at the end of each spoke a seat, a block behind said seat, a brake drum secured upon said blocks, a rim carried by said spokes, and having an annular bead, the front outer corner of said drum having an annular inclined face against which said bead bears and means resting on said seats for bearing against said bead and clamping said rim onto said spokes.

2. In a steel spoke wheel having at the end of each spoke a seat, a block behind said seat, a brake drum secured upon said blocks, a rim carried by said spokes, and having an annular V-shaped bead, the front outer corner of said drum having an annular face against which the inner face of said bead bears, lugs resting upon said seats, each lug having an inclined face and means clamping the inclined face of each lug against the outer face of said bead, whereby said rim is supported by said drum and said lugs.

3. In a vehicle wheel, a spoked wheel body having a spoke formed with a shoulder and having an enlarged portion positioned in rear of said shoulder, a brake drum having a brake flange resting upon the enlarged portion and having a radial inwardly extending flange embracing the front side of said enlarged portion and engaging said shoulder, a flared seat on said brake drum, a rim carried by the wheel body having an inwardly extending projection formed with an inclined face engaging the flared seat on said brake drum, and means for securing the rim upon the wheel body including a lug having a base portion positioned upon said shoulder and engaging the radial flange on said brake drum, said lug having another portion engageable with the projection on said rim for clamping the inclined face of the latter into engagement with the flared seat on said brake drum.

4. In a vehicle wheel, a spoked wheel body having a spoke formed with a shoulder and an enlarged portion positioned in rear of the shoulder, a brake drum having a brake flange positioned upon the enlarged portion aforesaid and having a radial flange extending inwardly from the brake flange and engaging the shoulder aforesaid, a rim member formed with an inwardly projecting portion having one side thereof engageable with the front side of the brake drum, and means positioned upon said shoulder and engaging the opposite side of said projection for clamping the rim to the brake drum.

5. In a vehicle wheel, a wheel body member having an axially extending portion at the outer end thereof and having a shoulder positioned radially inwardly from the portion aforesaid, a brake drum member seated upon the said axially extending portion of the wheel body member and having a radial inwardly extending flange embracing the front side of the said portion and engaging the shoulder aforesaid, a rim member seated upon the outer surface of the brake drum and having an inwardly extending projection engaging the front side of the brake drum, and a member having a portion seated upon the shoulder and another portion engaging said projection for clamping the brake drum and rim to the wheel body member.

In testimony whereof I have affixed my signature.

JOHN WILLIAM WHITE.